Patented Aug. 3, 1954

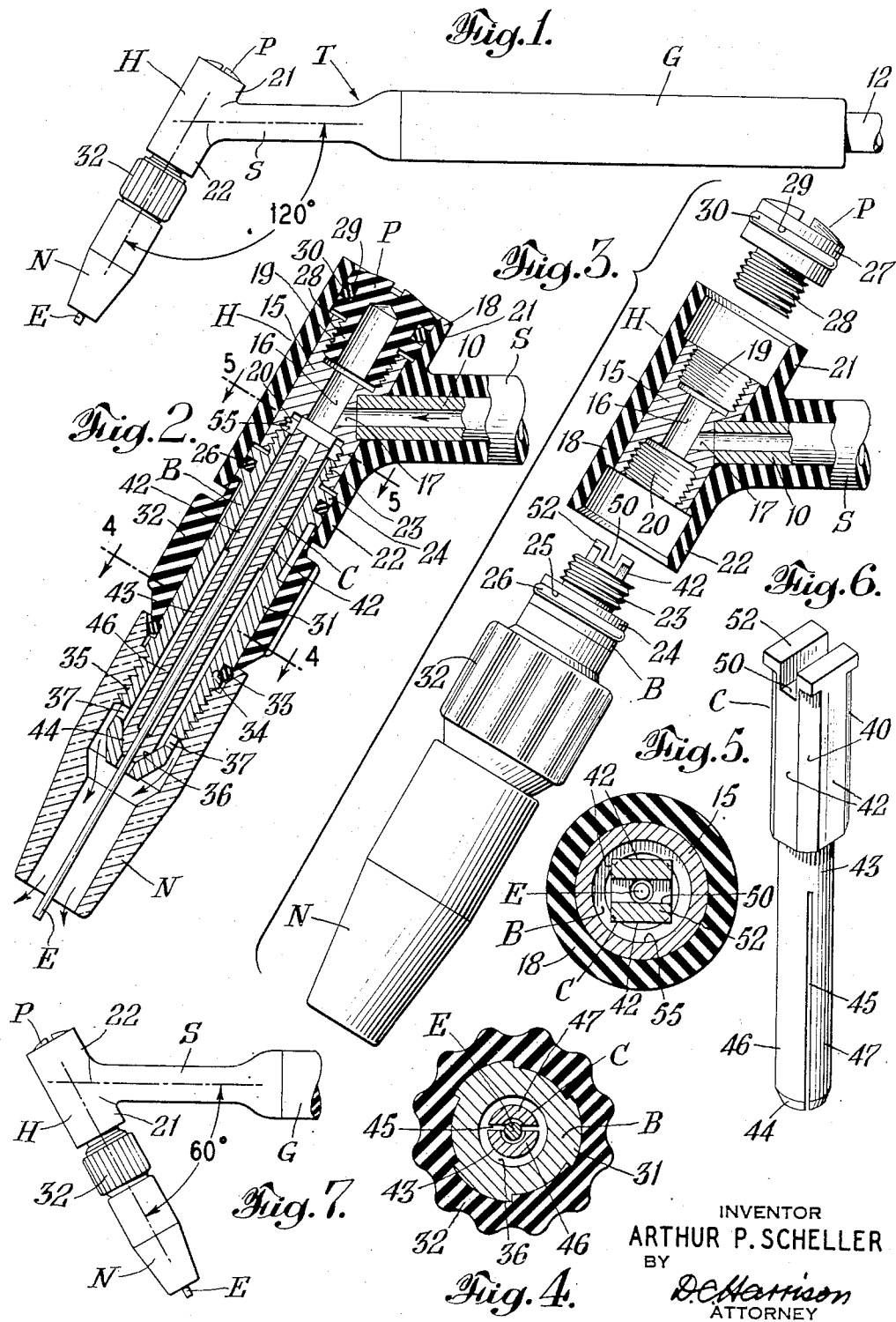

2,685,631

UNITED STATES PATENT OFFICE 2,685,631

GAS SHIELDED ARC WELDING TORCH

Arthur P. Scheller, Chatham, N. J., assignor to Union Carbide and Carbon Corporation, a corporation of New York Application May 26, 1951, Serial No. 228,470

13 Claims. (Cl. 219—15)

This invention relates to gas shielded arc welding torches adapted to hold an electrode to strike an arc with the work, and to project a stream of gas to shield the arc.

While some features of the invention are of general application to a metal arc torch employing a consumable electrode, and to a machine propelled torch, the invention is particularly directed to a torch employing an electrode of non-consumable metal such as tungsten, and to a manually operated torch adapted to be held in the hand of the operator.

The main objects of the invention are to improve the manufacture of the torch, to reduce the number of parts, to simplify the parts and economize the cost of construction thereof, to facilitate the assembly of the parts, and to reduce the cost of securing them together.

Other objects are to provide, for the portions of the torch most subject to deterioration in use, individual parts readily separable from the permanent body of the torch, to reduce the cost of such individual parts so as to be economically expendable, and to facilitate the ready removal and replacement of such expendable parts. These objects are particularly directed to a quick release collet, for ready adjustment of electrode length without using wrenches, ready exchange of collet size to fit a different electrode diameter, and ready removal and replacement of the expendable collet when deteriorated in use.

Further objects of the invention are to provide a more flexible torch for welding in positions otherwise not readily accessible, and to provide a light weight torch particularly for welding thin gauge metal at low currents. The flexibility of the torch is particularly enhanced by providing the torch with a stub head at an oblique angle to the shank, an electrode holder detachably secured to one end of the stub head and an electrode cap detachably secured to the other, the holder and cap being interchangeable to dispose the electrode at either an acute angle or obtuse angle to the shank.

According to the present invention the torch comprises an electrode holding hollow current and gas supplying head, which is rigidly connected intermediate its ends at an oblique angle to the end of a shank containing a gas supply tube. An electrode holder barrel is detachably connected to one end of the head in gas tight relation, and carries electrode gripping means, preferably a collet having a split external conical end engaging an internal conical seat at the bottom of the barrel. The upper end of the collet engages the torch head as an abutment to compress the collet against the seat and contract the collet jaws to grip the electrode. A gas directing nozzle is mounted on the barrel, which has a continuous gas passage from the interior of the torch head to the interior of the nozzle.

The torch head is preferably a stub head, being relatively short with respect to the length of the barrel. The end of the stub head opposite from the barrel is preferably equally short, and closed by an electrode cap with a similar detachable connection so that the barrel and cap may be interchanged to dispose the electrode and nozzle selectively at an acute or an obtuse angle to the torch shank.

In the drawings:

Fig. 1 is an elevation of the torch;

Fig. 2 is a section through the torch head;

Fig. 3 is an exploded view of the torch;

Fig. 4 is a section taken along the line 4—4 of Fig. 2;

Fig. 5 is a section taken along the line 5—5 of Fig. 2;

Fig. 6 is a perspective view of the collet; and

Fig. 7 is a view similar to Fig. 1 but showing the electrode holder and cap interchanged to dispose the electrode and its nozzle at an acute angle to the shank.

The torch indicated generally at T comprises a hollow current and gas supplying head H rigidly connected intermediate its ends at an oblique angle to a shank S, which may have a handle or hand grip G. Detachably connected to one end of the head H is an electrode holder barrel B, containing a collet C co-acting therewith to grip an electrode E. A gas directing nozzle N is mounted on the electrode holder barrel B, which has a continuous gas passage from the interior of the head H to the interior of the nozzle N.

The other end of the head H opposite to the barrel B is closed by an electrode cap P detachably connected thereto in gas tight relation. The connections for the cap P and barrel B are identical, so that they can be interchanged to dispose the electrode E and its nozzle N at an acute angle to the shank S as shown in Fig. 7.

Both ends of the head H are of substantially the same length, and the entire head is relatively short as compared to the barrel B, so that it may be characterized as a stub head, which is of advantage in manipulating the torch as well as improving the take apart feature for overhaul and replacement. The shank S contains a metal tube 10 which constitutes both a welding current conductor and a gas supply conduit. A suitable electric conductor from a source of welding current, and a gas tube from a source of shielding gas, pass through the handle G and are suitably connected to the tube 10.

The head H comprises a metal cylinder 15 having an axial electrode-receiving and gas-conducting bore 16, and rigidly connected intermediate its ends to the end of the gas supply tube 10 at an oblique angle thereto, being secured in position by silver solder. A lateral oblique bore 17 connects the interior of the tube 10 with the head bore 16. The outer surfaces of the cylinder 15 and the tube 10 are completely covered with a continuous layer of electrical insulating material 18.

The detachable connections for the cap P and the electrode holder barrel B are preferably formed by counterboring both ends of the cylinder 15 to a diameter larger than the bore 16 and tapping both ends with the same pitch and diameter, forming an acute angled threaded socket 19 and an obtuse angled threaded socket 20. The insulation 18 overhangs the same distance at both ends, forming equal skirts 21 and 22.

The barrel B has a threaded upper end 23 forming a plug adapted to enter either threaded socket 19 or 20, and an annular collar 24 therebelow adapted to enter either skirt 21 or 22. The collar 24 has an annular groove 25 therein receiving an O-ring 26 compressed by the skirt and forming a gas tight seal. The cap P has a head 27 of the same diameter as the collar 24, and a plug 28 of the same pitch and diameter as the plug 23. The head 27 has a groove 29 receiving an O-ring 30 to engage the other skirt.

Below the collar 24, the barrel B is splined as at 31 to receive a fluted hand grip sleeve 32 of insulating material, which is preferably formed in one piece and slipped over the lower end, and held in place by an O-ring 33 received in an annular groove 34 in the barrel B below the splines 31. The barrel B is threaded as at 35 below the groove 34 to receive the nozzle N, which engages the O-ring 33 to effect a gas tight seal. The insulating sleeve 32 extends from the head skirt 21 or 22 to the nozzle N forming a continuous insulating cover for the torch.

The lower end of the barrel B has an internal conical seat 36 for the collet C, above which are drilled radial apertures 37, to pass shielding gas from the interior of the barrel B to the interior of the nozzle N. The barrel B which is relatively permanent, is preferably made of electrically and rapid heat conductive metal such as copper or copper-base alloy. The collet C which is more expendable, and is generally provided in several sizes of internal jaw diameter to fit different sizes of electrodes, is made of less expensive material, such as carbon steel. The nozzle N is preferably constructed of ceramic material to resist the heat of the arc, and to make the torch usable with both direct current and high-frequency stabilized alternating current welding.

The collet C has its upper portion of a cross section partly cylindrical as at 40 to fit snugly in the base of the barrel B, and partly non-cylindrical, preferably flattened or slabbed off as at 42. The lower portion of the collet C is of reduced diameter as at 43, to increase the resilience of the collet jaws. This portion terminates in an external conical end 4.

The collet C has an axial bore larger than that of the electrode E and extending from its upper end for the greater part of its length. The lower end 44 is counterbored to substantially the electrode diameter, and slotted as at 45 for the greater part of the length of the reduced portion 43, to form the collet jaws. As shown in Fig. 4, for smaller sizes of electrode the slot is preferably eccentric, because the width of the slotting saw may take up the greater part of the electrode diameter. The eccentric slotting leaves an aligning groove on one jaw 46, even though the other jaw 47 may be substantially flat.

The upper end of the collet C has a transverse groove 50 which intersects the side flats 42. The collet is conveniently lathe turned from square stock, so that when the cylindrical portion 40 is formed, the side flats remain from the square stock, and also leaving a square head 52 which is of advantage in removing a light collet from the barrel B, and also in preventing the collet from being inserted in reversed position.

The threaded upper end 23 of the barrel B is shorter than the socket 19 or 20 in the head cylinder 15, so that when the barrel B is screwed in, an annular chamber 55 is formed. The gas from the shank tube 10 passes through the lateral bore 17 down into the head bore 16, laterally through the groove 50 in the collet head to the chamber 55, which distributes the gas to the longitudinal passages left by the flats 42. These deliver the gas to the larger annular chamber surrounding the reduced collet portion 43, from which the gas passes through the radial apertures 37 to the interior of the nozzle N.

What is claimed is:

1. In a gas shielded arc welding torch, an insulation covered hollow metal current and gas supplying head, an electrode holder detachably connected to said head in gas tight and electrically conducting relation, a collet slidably inserted in said electrode holder and clamped between said head and holder to grip an electrode, and a gas directing nozzle mounted on said holder, said holder having a continuous internal longitudinal gas passage leading from the interior of said head past said collet to the interior of said nozzle, said head and holder having aligned bores, said head having a socket surrounding its bore, said holder having a plug on the top thereof aligned with its bore and fitted into said socket in readily removable relation, said holder having an internal conical seat at the lower end of its bore, said collet having a slotted external conical lower end engaging said seat, the upper end of said collet engaging said head inside its socket, said collet being removable by withdrawing said plug from said socket and sliding said collet out through said plug.

2. In a gas shielded arc welding torch, a relatively short insulation covered hollow metal current and gas supplying stub head, a relatively long electrode holder barrel connected to said head in detachable gas tight and electrically conducting relation, electrode gripping means comprising a collet carried by said barrel and adapted to grip an electrode, and a gas directing nozzle mounted on said holders, said holder having a continuous gas passage from the interior of said head to the interior of said nozzle, said stub head and said long barrel having aligned bores, the bottom of said head having screw threads surrounding its bore, said barrel having screw threads on the top thereof surrounding its bore and engaging those of said stub head, said barrel having an internal conical seat at the lower end of its bore, said collet having a slotted external conical lower end engaging said seat and forming said gripping means, the upper end of said collet engaging said stub head inside its screw threads, said collet being removable by unscrewing said holder from said head and sliding said collet out through said screw threads on the top of said barrel.

3. In a gas shielded arc welding torch, an insulation covered hollow metal current and gas supplying head, an electrode holder detachably connected to an end of said head in gas tight and electrically conducting relation, an electrode cap similarly connected to the opposite end of said head so that said cap and electrode holder may be interchanged, and a gas directing nozzle mounted on said holder, said holder having a continuous gas passage from the interior of said head to the interior of said nozzle when connected to either end of said head, said head having a through bore and an equal socket at each end of said bore, said holder having an axial bore with an internal conical seat at the bottom of its bore, a collet in said bore having a slotted external conical lower end engaging said seat, the upper end of said collet engaging said stub head inside either of its sockets, and identical plugs on said electrode cap and on the top of said holder aligned with its bore adapted to selectively fit into either of said sockets on said head.

4. In a gas shielded arc welding torch, an insulation covered hollow metal current and gas supplying head, an electrode holder of electrically and rapid heat conductive material detachably connected to said head in gas tight and electrically conducting relation, a fluted hand grip sleeve of insulating material formed in one piece and slipped over the lower end of said electrode holder, said electrode holder being splined to receive said fluted sleeve, means for holding said sleeve on said holder to engage the insulation covering of said head and continue the insulation down over the detachable joint between said head and holder, a collet in said electrode holder and clamped between said head and holder to grip an electrode, and a gas directing nozzle mounted on said holder, said holder having a continuous gas passage from the interior of said head to the interior of said nozzle, said head and holder having aligned bores, the bottom of said head having a threaded portion aligned with its bore, said holder having a threaded portion on the top thereof aligned with its bore and screwed together with said head, said holder having an internal conical seat at the lower end of its bore, said collet having a slotted externally conical lower end engaging said seat, the upper end of said collet engaging said stub head inside its threaded portion, said collet being removable by unscrewing said holder from said head and sliding said collet out through said threaded portion.

5. In a gas shielded arc welding torch, a hollow current and gas supplying head, an electrode holder barrel having an upper end detachably connected to said head in gas tight relation and a lower end having an internal conical seat, an electrode collet in said barrel having a split external conical lower end engaging said seat and an upper end extending above said barrel and abutting against said head, and a gas directing nozzle mounted on said sleeve above said seat, said barrel having a continuous gas passage from the interior of said head to the interior of said nozzle, said head and barrel having aligned bores, said head having a socket aligned with its bore, said barrel having a plug on the top thereof aligned with its bore and fitted into said socket, said head having an annular abutment at the bottom of its socket engaging the upper end of said collet, said barrel having an annular groove below said plug, and an O-ring in said groove engaging said head to seal the detachable connection against gas leakage.

6. In a gas shielded arc welding torch, a hollow current and gas supplying head, an electrode holder barrel having an upper end in threaded engagement with said head and a lower end having an internal conical seat, an electrode collet in said barrel having a split external conical lower end engaging said seat and an upper end abutting against said head, and a gas directing nozzle mounted on said barrel above said seat, said barrel having a continuous gas passage from the interior of said head to the interior of said nozzle, said head and barrel having aligned bores, said head having a threaded bottom aligned with its bore, said barrel having a threaded top aligned with its bore and screwed together with said head bottom, said head having an annular abutment at the bottom inside the screw threads thereof engaging the upper end of said collet, said barrel having an annular groove below its screw threads, and an O-ring in said groove engaging said head to seal the detachable screwed connection against gas leakage.

7. In a gas shielded arc welding torch, an electrode holding hollow current and gas supplying head, an electrode holder barrel having an upper end detachably connected to said head in gas tight relation, a lower end having an internal conical seat, and a hand grip portion intermediate its ends covered with insulating material; an electrode collet in said barrel having a split external conical lower end engaging said seat and an upper end abutting against said head, and a gas directing nozzle mounted on said barrel above said seat and depending therebelow, said barrel having a continuous gas passage from the interior of said head to the interior of said nozzle, said head and barrel having aligned bores, said head having a socket aligned with its bore, said barrel having a plug on the top thereof aligned with its bore and fitted into said socket, said head having an annular abutment at the bottom of its socket engaging the upper end of said collet, said barrel having an externally threaded portion between said seat and said insulated hand grip portion and an annular groove above its threads, an O-ring in said groove, and said nozzle having an internally threaded upper portion and an annular rim thereabove engaging said O-ring and clamping it against said insulated portion to prevent gas leakage through the nozzle threads.

8. In a gas shielded arc welding torch, an electrode holding hollow current and gas supplying head, an electrode holder barrel having an upper end detachably connected to said head in gas tight relation and a lower end having an internal conical seat, an electrode collet having a split external conical lower end engaging said seat and a portion thereabove fitting in said barrel but having a cross section partly non-circular to leave a longitudinally extending space, a gas directing nozzle mounted on said barrel above said seat; said barrel, collet and head having registering portions forming a gas passage from the gas bore in said head to said space, and said barrel having a gas passage from said space to the interior of said nozzle, said head and barrel having aligned bores, said head having a threaded bottom aligned with its bore, said barrel having a threaded top aligned with its bore and screwed together with said head, said head having an annular abutment inside its threads engaging the upper end of said collet.

9. In a gas blanketed arc welding torch, a hollow current and gas supplying head, an electrode holder barrel having an upper end detachably connected to said head in gas tight relation and a lower end having an internal conical seat, an electrode collet having a split external conical lower end engaging said seat and a portion thereabove fitting in said barrel but having a cross section partly noncircular to leave a longitudinally extending space therebetween, the upper end of said collet having a transverse groove connecting said space with the gas bore in said head, and a gas directing nozzle mounted on said barrel above said seat and depending therebelow, said barrel having a passage connecting the lower end of said longitudinal space with the interior of said nozzle, said head and barrel having aligned bores, said head having a socket aligned with its bore, said barrel having a plug on the top thereof aligned with its bore and fitted into said socket, said barrel having an annular abutment at the bottom of its socket engaging the upper end of said collet.

10. In a gas shielded arc welding torch, a gas supply tube, an electrode holding hollow current and gas supplying head rigidly connected intermediate its ends to the end of said gas supply tube at an oblique angle thereto with one end of said head at an acute and the other at an obtuse angle to said tube, an electrode holder detachably connected to one end of said head and an electrode cap detachably connected to the other end of said head, and a gas directing nozzle mounted on said holder, the detachable connections being identical so that said cap and electrode holder may be interchanged to dispose the electrode and nozzle selectively at an acute angle or at an obtuse angle to said gas supply tube, said head having a through bore and a socket at each end of said bore, said holder having an axial bore with an internal conical seat at the lower end of said bore, a collet in said bore having a slotted external conical lower end engaging said seat, the upper end of said collet engaging said head inside either of its sockets, and identical plugs on the electrode cap and on the top of said holder aligned with its bore adapted to be selectively fitted into either of said sockets on said head.

11. In a gas shielded arc welding torch, a gas supply tube, an electrode holding hollow current and gas supplying head rigidly connected intermediate its ends to the end of said gas supply tube at an oblique angle thereto, an electrode holder detachably connected to one end of said head in gas tight relation, a gas directing nozzle mounted on said holder, said holder having a continuous gas passage leading from the interior of said head to the interior of said nozzle, and an electrode cap similarly detachably connected to the other end of said head, the detachable gas tight connections having the same dimensions so that the electrode holder and its nozzle may be interchanged with said cap to dispose the electrode and nozzle selectively at an acute or an obtuse angle to said tube, said head having a through bore and a threaded portion at each end of said bore, said holder having an axial bore with an internal conical seat at the lower end of said bore, a collet in said bore having a slotted external conical lower end engaging said seat, the upper end of said collet engaging said head inside either of its threaded portions, and identically threaded portions on the electrode cap and the top of said holder aligned with its bore adapted to be selectively screwed together with either of said threaded portions on said head.

12. In a gas shielded arc welding torch, a shank having a gas supply tube therein, a hollow current and gas supplying head rigidly connected intermediate its ends to the end of said shank with the gas tube discharging into said hollow head, one end of said head being disposed at an acute angle and the other at an obtuse angle to said shank, an electrode holder having threaded engagement with one end of said head, an electrode cap having threaded engagement with the other end of said head, the threaded engagement at each end of said head being of the same pitch and diameter, whereby said cap and electrode holder may be interchanged to dispose the electrode relatively at an acute angle or at an obtuse angle to said shank, said head and holder having aligned bores, said head having an internally threaded socket aligned with its bore, identically externally threaded plugs on said electrode cap and on the top of said holder aligned with its bore, said holder having an internal conical seat at the lower end of its bore, a collet in said bore having a slotted external conical lower end engaging said seat, the upper end of said collet extending above the top of said holder bore and engaging said head inside its socket.

13. In a gas shielded arc welding torch, a gas supply tube, an electrode holding hollow current and gas supplying head rigidly connected intermediate its ends to the end of said gas supply tube at an oblique angle thereto, an electrode holder barrel having an upper end detachably connected to one end of said head in gas tight relation and a lower end having an internal conical seat, an electrode collet in said barrel having a split external conical lower end engaging said seat and an upper end abutting said head, a gas directing nozzle mounted on said barrel, said barrel having a continuous passage from the interior of said head to the interior of said nozzle, and an electrode cap detachably connected to the other end of said head, the detachable connections being identical so that said barrel with its collet and nozzle may be interchanged with said cap to selectively dispose the electrode at an obtuse or an acute angle to said tube with said collet abutting the corresponding end of said head, and said barrel having its continuous passage extending from said corresponding end of said head to said nozzle.

References Cited in the file of this patent

UNITED STATES PATENTS

| Number | Name | Date |
|---|---|---|
| 2,393,199 | Somerville | Jan. 15, 1946 |
| 2,468,808 | Drake | May 3, 1949 |
| 2,512,706 | Anderson | June 27, 1950 |
| 2,512,707 | Anderson | June 27, 1950 |
| 2,571,684 | Craven | Oct. 16, 1951 |

FOREIGN PATENTS

| Number | Country | Date |
|---|---|---|
| 558,802 | Great Britain | Jan. 21, 1944 |